(12) United States Patent
Asao et al.

(10) Patent No.: US 12,221,923 B2
(45) Date of Patent: Feb. 11, 2025

(54) GAS TURBINE COGENERATION SYSTEM AND METHOD OF OPERATING THE SAME

(71) Applicant: MITSUBISHI HEAVY INDUSTRIES, LTD, Tokyo (JP)

(72) Inventors: Takashi Asao, Tokyo (JP); Kazuhiko Sato, Tokyo (JP); Shohei Yoshida, Tokyo (JP); Ryo Akiyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/503,342

(22) Filed: Nov. 7, 2023

(65) Prior Publication Data
US 2024/0175392 A1    May 30, 2024

(30) Foreign Application Priority Data

Nov. 30, 2022 (JP) ................................ 2022-191402

(51) Int. Cl.
*F02C 7/141* (2006.01)
*F02C 3/30* (2006.01)

(52) U.S. Cl.
CPC ............... *F02C 3/30* (2013.01); *F02C 7/141* (2013.01); *F05D 2220/323* (2013.01); *F05D 2240/35* (2013.01); *F05D 2260/20* (2013.01); *F05D 2270/082* (2013.01)

(58) Field of Classification Search
CPC ......... F05D 2270/082; F05D 2220/323; F05D 2240/35; F05D 2260/20; F02C 3/30; F02C 7/141
See application file for complete search history.

(56) References Cited

U.S. PATENT DOCUMENTS

| 2014/0260314 A1 | 9/2014 | Koganezawa et al. |
| 2015/0275755 A1* | 10/2015 | Ogata ..................... F23R 3/286 60/737 |
| 2021/0372623 A1* | 12/2021 | Kulkarni .................. F02C 7/18 |
| 2022/0065162 A1 | 3/2022 | Hunt et al. |
| 2023/0258126 A1* | 8/2023 | Terwilliger ............. F02C 1/005 60/39.182 |

FOREIGN PATENT DOCUMENTS

| JP | S637823 A | 1/1988 |
| JP | 2014-173572 | 9/2014 |
| JP | 2015-102266 A | 6/2015 |
| JP | 2022-42010 | 3/2022 |

OTHER PUBLICATIONS

Japanese Office Action dated Dec. 17, 2024 in Japanese application No. 2022-191402, with machine translation, 9 pages.

* cited by examiner

*Primary Examiner* — Todd E Manahan
*Assistant Examiner* — Rodolphe Andre Chabreyrie
(74) *Attorney, Agent, or Firm* — Wenderoth, Lind & Ponack, L.L.P.

(57) ABSTRACT

A gas turbine cogeneration system includes a denitration control part for outputting to a denitration device a control command to set the amount of NOx emissions at a heat recovery steam generator outlet not more than a boiler outlet target value. The denitration control part is configured to generate the control command with reference to at least a first addition amount of a reducing agent obtained by calculation based on a NOx parameter which is a parameter correlated with the amount of NOx emissions at a turbine outlet.

8 Claims, 10 Drawing Sheets

GAS TURBINE COGENERATION SYSTEM AND METHOD OF OPERATING THE SAME

TECHNICAL FIELD

The present disclosure relates to a gas turbine cogeneration system and a method of operating the same.

The present application claims priority based on Japanese Patent Application No. 2022-191402 filed on Nov. 30, 2022, the entire content of which is incorporated herein by reference.

BACKGROUND ART

A gas turbine cogeneration system disclosed in Patent Document 1 includes a gas turbine, a heat recovery steam generator which generates steam using exhaust gas from the gas turbine, a process system which supplies steam discharged from the heat recovery steam generator to a steam consumption facility, a first steam system which supplies steam extracted from the process system to the upstream side of a flame zone in a combustor of the gas turbine, and a second supply system which supplies steam extracted from the process system to the downstream side of the flame zone. In the combustor, a normal fuel such as natural gas can be co-fired with a gasification gas fuel such as coal gas or biomass gas. In the above-described gas turbine cogeneration system, the amount of steam supplied by the first supply system and the second supply system is controlled based on the co-firing ratio of normal fuel and gasification gas and the amount of steam required in the steam facility.

CITATION LIST

Patent Literature

Patent Document 1: JP2014-173572A

SUMMARY

When the gasification gas is hydrogen gas fuel mainly composed of hydrogen gas, with a change in the amount of hydrogen gas fuel supplied, the flame temperature in the combustor changes, and the concentration of nitrogen oxides discharged from the gas turbine changes. The denitration for removing nitrogen oxides (hereinafter also referred to as "NOx") from exhaust gas discharged from the gas turbine should be performed quickly with a change in the hydrogen gas fuel co-firing ratio, which is the co-firing ratio of hydrogen gas fuel and the other fuel.

An object of the present disclosure is to provide a gas turbine cogeneration system and a method of operating the same whereby it is possible to perform the denitration operation quickly following the increase in the amount of NOx emissions from the gas turbine when the hydrogen gas fuel co-firing ratio in the gas turbine increases.

A gas turbine cogeneration system according to at least one embodiment of the present disclosure includes: a gas turbine including a compressor, a combustor, and a turbine: a hydrocarbon fuel supply facility for supplying hydrocarbon gas fuel to the combustor: a hydrogen gas fuel supply facility for supplying hydrogen gas fuel which is fuel mainly composed of hydrogen gas to the combustor: a heat recovery steam generator for generating steam using exhaust gas discharged from the turbine: an upstream steam line for supplying the steam discharged from the heat recovery steam generator to a head end side of the combustor; a denitration device for denitration of the exhaust gas by adding a reducing agent to the exhaust gas flowing through the heat recovery steam generator; and a denitration control part for outputting to the denitration device a control command to set the amount of NOx emissions at the heat recovery steam generator outlet not more than a boiler outlet target value. The denitration control part is configured to generate the control command with reference to at least a first addition amount of the reducing agent obtained by calculation based on a NOx parameter which is a parameter correlated with the amount of NOx emissions at the turbine outlet.

A method of operating a gas turbine cogeneration system according to at least one embodiment of the present disclosure, the gas turbine cogeneration system comprising: a gas turbine including a compressor, a combustor, and a turbine: a hydrocarbon fuel supply facility for supplying hydrocarbon gas fuel to the combustor: a hydrogen gas fuel supply facility for supplying hydrogen gas fuel which is fuel mainly composed of hydrogen gas to the combustor; a heat recovery steam generator for generating steam using exhaust gas discharged from the turbine: an upstream steam line for supplying the steam discharged from the heat recovery steam generator to a head end side of the combustor; and a denitration device for denitration of the exhaust gas by adding a reducing agent to the exhaust gas flowing through the heat recovery steam generator, includes a denitration control step of outputting to the denitration device a control command to set the amount of NOx emissions at a heat recovery steam generator outlet not more than a boiler outlet target value. The denitration control step includes generating the control command with reference to at least a first addition amount of the reducing agent obtained by calculation based on a NOx parameter which is a parameter correlated with the amount of NOx emissions at a turbine outlet.

The present disclosure provides a gas turbine cogeneration system and a method of operating the same whereby it is possible to perform the denitration operation quickly following the increase in the amount of NOx emissions from the gas turbine when the hydrogen gas fuel co-firing ratio in the gas turbine increases.

DETAILED DESCRIPTION

Figure 1:
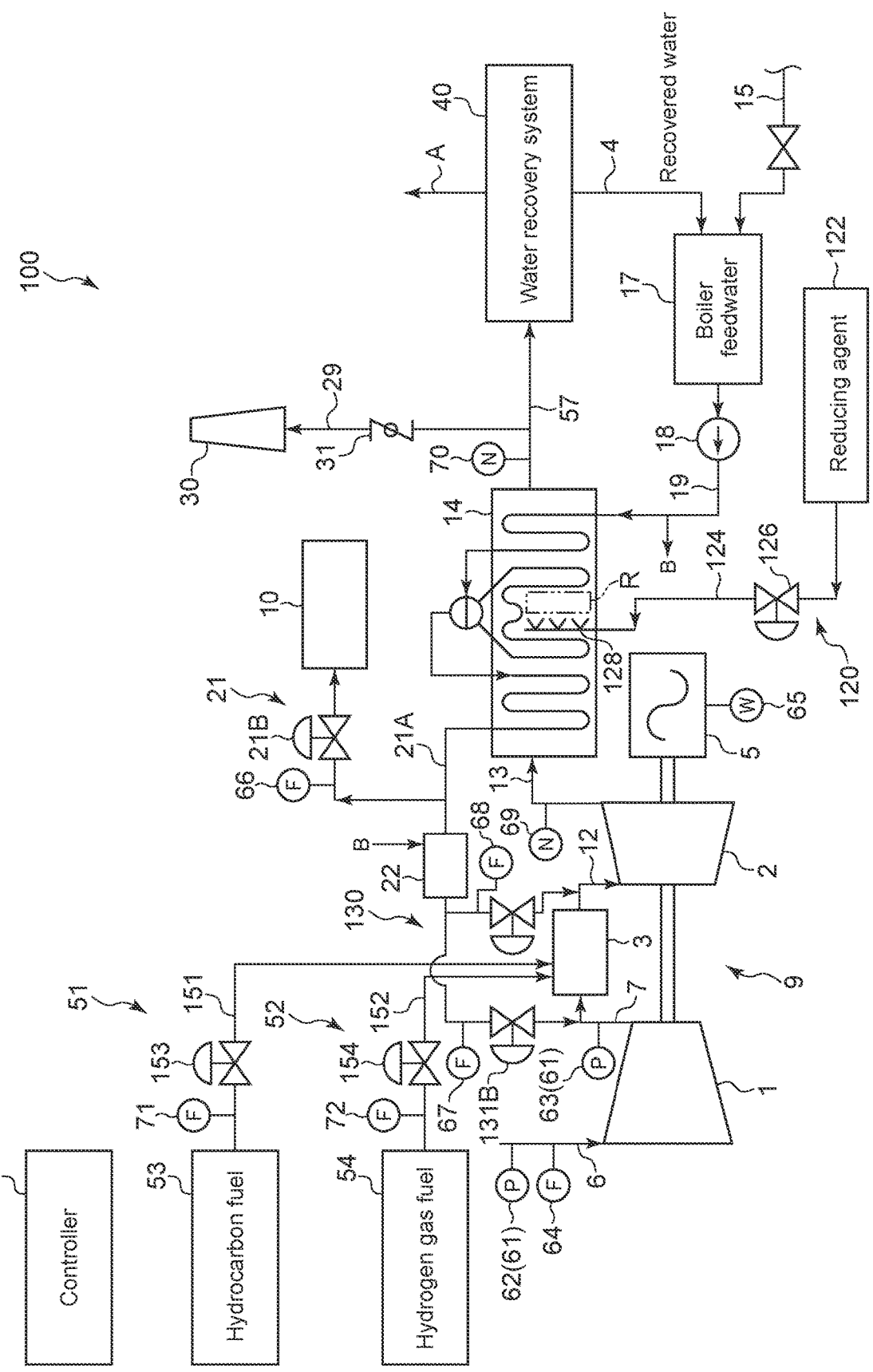
FIG. 1 is a schematic diagram of a gas turbine cogeneration system according to an embodiment.

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

<Overview of Gas Turbine Cogeneration System 100>

FIG. 1 is a schematic diagram of a gas turbine cogeneration system 100 (hereinafter, also referred to as cogeneration system 100) according to an embodiment of the present disclosure. The cogeneration system 100, which may be for example a power plant, includes a gas turbine 9 and a heat recovery steam generator 14. The gas turbine 9 includes a compressor 1 for generating compressed air 7 from compressor inlet air 6, a combustor 3 for burning fuel with oxygen in the compressed air 7 as an oxidant and raising the temperature of the compressed air 7 to generate combustion gas 12, a turbine 2 which rotates with the combustion gas 12 discharged from the combustor 3 as a driving source, and a generator 5 connected to the turbine 2. The fuel supplied to the combustor 3 includes hydrocarbon gas fuel and hydrogen gas fuel (details will be described later). The heat recovery steam generator 14 is configured to generate steam from boiler feedwater using heat recovered from exhaust gas 13 discharged from the turbine 2. The boiler feedwater is water to be supplied to the heat recovery steam generator 14.

The cogeneration system 100 includes a steam supply line 21 for supplying steam discharged from the heat recovery steam generator 14 to a steam consumer 10. The steam supply line 21 includes a steam pipe 21A connected to the heat recovery steam generator 14 and the steam consumer 10, and a steam flow control valve 21B disposed in the steam pipe 21A. By controlling the opening degree of the steam flow control valve 21B with a controller 90 described below; the consumer steam supply amount, which is the amount of steam supplied to the steam consumer 10, is controlled. The steam consumer 10 may be, for example, a steam turbine. The steam consumer 10 may be a steam turbine of a combined cycle power plant or an industrial process unit. The cogeneration system 100 further includes a steam extraction line 130 for supplying steam extracted from the steam supply line 21 to the combustor 3. The configuration of the steam extraction line 130 will be described in detail later.

Although not essential components of the present disclosure, the cogeneration system 100 may include a water recovery system 40 for recovering water contained in the exhaust gas 13 discharged from the heat recovery steam generator 14, a feedwater tank 17 for storing recovered water including water recovered from the water recovery system 40 as boiler feedwater, a feedwater line 15 for supplying the boiler feedwater to the feedwater tank 17, a feedwater line 19 connected to the feedwater tank 17 and the heat recovery steam generator 14, and a feedwater pump 18 disposed in the feedwater line 19. When the feedwater pump 18 is driven, the boiler feedwater stored in the feedwater tank 17 is supplied to the heat recovery steam generator 14 through the feedwater line 19. Higher temperature of boiler feedwater supplied to the heat recovery steam generator 14 is preferred. This is because the heat required by the heat recovery steam generator 14 to generate steam is reduced, and the efficiency of the cogeneration system 100 is improved.

Although not essential components of the present disclosure, the cogeneration system 100 may include an exhaust gas supply line 57 which is a supply line for the exhaust gas 13 from the heat recovery steam generator 14 to the water recovery system 40, an exhaust line 29 diverging from the exhaust gas supply line 57, and an exhaust damper 31 disposed in the exhaust line 29. The exhaust gas 13 flowing through the exhaust line 29 is exhausted to the outside through an exhaust tower 30. In an embodiment of the present disclosure, when the exhaust gas 13 is supplied from the cogeneration system 100 to the water recovery system 40, the exhaust damper 31 is closed and the exhaust gas 13 does not flow into the exhaust line 29.

<Schematic Configuration of Combustor 3>

Figure 2:
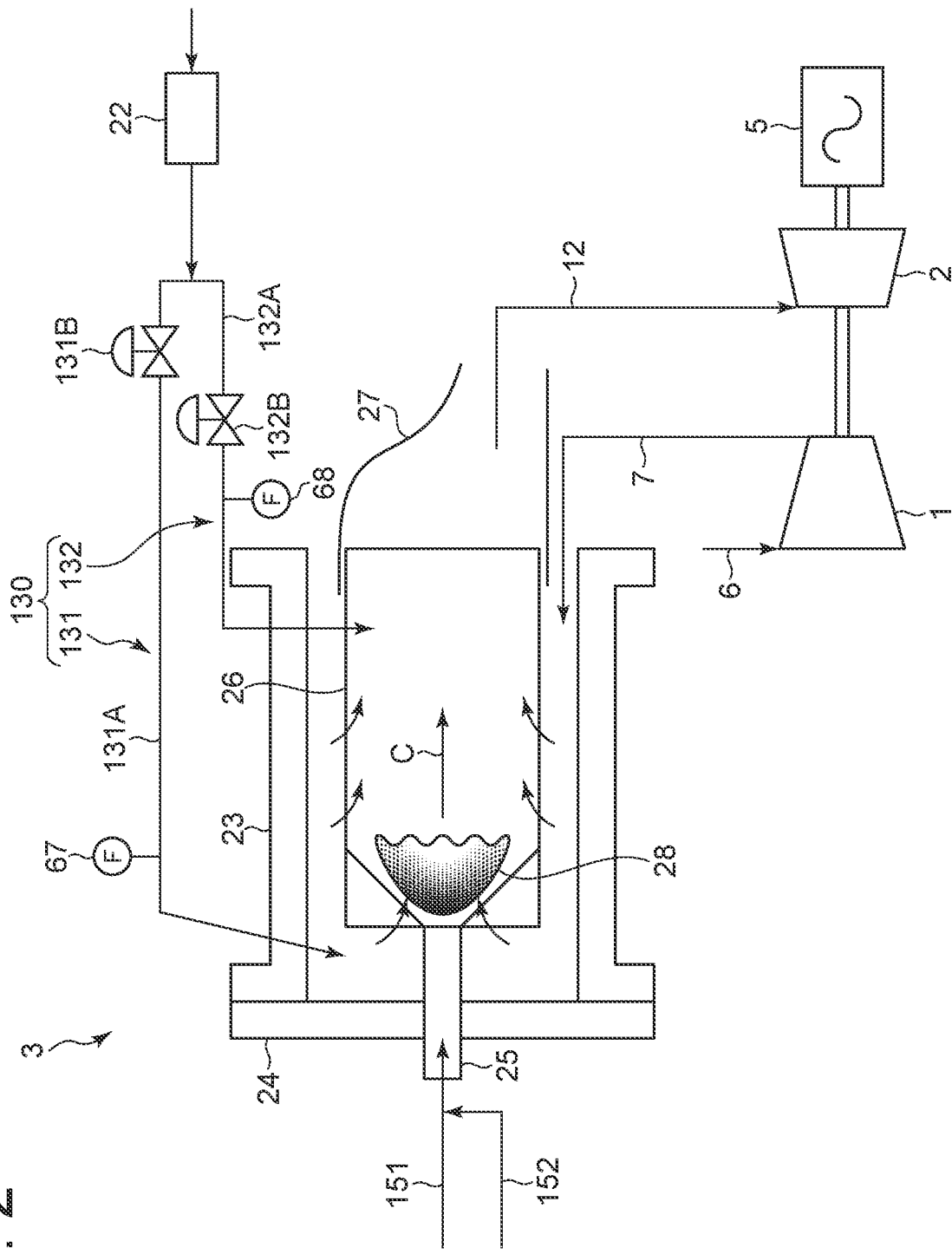
FIG. 2 is a schematic diagram of a combustor according to an embodiment.

FIG. 2 is a schematic diagram of the combustor 3 according to an embodiment of the present disclosure. The combustor 3 includes a cylindrical combustor casing 23, a head end 24 disposed at one end of the combustor casing 23, a fuel nozzle 25 disposed in the head end 24, a cylindrical combustion liner 26 which separates unburned air from burnt combustion gas 12, and a combustor transition piece 27 connected to the downstream side of the combustion liner 26. The compressed air 7 is supplied to the combustor casing 23. In the combustor casing 23, the compressed air 7 flows through an annular space formed outside the combustion liner 26 toward the head end 24. The compressed air 7 flowing through the annular space flows into the combustion liner 26 and mixes with fuel injected into the combustion liner 26 from the fuel nozzle 25. The fuel burns inside the combustion liner 26 to generate a flame 28 inside the combustion liner 26. The combustion gas 12 generated inside the combustion liner 26 is discharged from the combustor transition piece 27 and flows into the turbine 2.

<Fuel Supply System of Combustor 3>

Referring to FIG. 1 again, the fuel supplied to the combustor 3 includes hydrocarbon gas fuel and hydrogen gas fuel. The cogeneration system 100 includes a hydrocarbon fuel supply facility 51 for supplying the hydrocarbon gas fuel to the combustor 3 and a hydrogen gas fuel supply facility 52 for supplying the hydrogen gas fuel to the combustor 3. The hydrocarbon fuel supply facility 51 includes a first supply source 53 which is a supply source of the hydrocarbon gas fuel, a first pipe 151 for directing the hydrocarbon gas fuel from the first supply source 53 to the fuel nozzle 25 (see FIG. 2) of the combustor 3, and a first flow control valve 153 disposed in the first pipe 151. Similarly, the hydrogen gas fuel supply facility 52 includes a second supply source 54 which is a supply source of the hydrogen gas fuel, a second pipe 152 for directing the hydrogen gas fuel from the second supply source 54 to the fuel nozzle 25, and a second flow control valve 154 disposed in the second pipe 152. By controlling the opening degree of the first flow control valve 153 and the opening degree of the second flow control valve 154 with a controller 90 described below; the hydrocarbon gas fuel supply amount, which is the supply amount of the hydrocarbon gas fuel, and the hydrogen gas fuel supply amount, which is the supply amount of the hydrogen gas fuel, are adjusted. In other words, the controller 90 can adjust the hydrogen gas fuel co-firing ratio in the combustor 3. The hydrogen gas fuel co-firing ratio is the proportion of the hydrogen gas fuel in the fuel supplied to the combustor 3. This proportion is a value calculated on a calorific value or weight basis. In the present embodiment, the hydrocarbon gas fuel is off gas. In another embodiment, the hydrocarbon gas fuel may be natural gas. The hydrogen gas fuel is fuel mainly composed of hydrogen gas.

As the hydrogen gas fuel supply amount increases and the hydrogen gas fuel co-firing ratio increases, the amount of carbon dioxide gas generated in the combustor 3 decreases, but the temperature of the flame 28 of the combustor 3 increases, so the amount of NOX generation increases. Therefore, when the hydrogen gas fuel co-firing ratio changes, a denitration device 120, which will be described below; needs to operate so that the amount of NOx emissions at the outlet of the heat recovery steam generator 14 (heat recovery steam generator outlet) is maintained not more than the boiler outlet target value. The boiler outlet target value is a value that reflects a certain degree of margin in the regulation value in the area where the cogeneration system 100 is installed, and is a constant value.

<Configuration of Steam Extraction Line 130>

The steam extraction line 130 shown in FIGS. 1 and 2 is configured to supply steam extracted from the steam supply line 21 to the head end 24 side of the combustor 3 and the turbine 2 side of the combustor 3. The head end 24 side of the combustor 3 refers to the upstream side in the combustion gas flow direction from the region of the combustor casing 23 where the flame 28 is formed. The combustion gas flow direction indicates the direction in which the combustion gas 12 flows in the combustion liner 26, and is illustrated by arrow C (see FIG. 2). Further, the turbine 2 side of the combustor 3 refers to the downstream side in the combustion gas flow direction from the region of the combustor casing 23 where the flame 28 is formed.

As shown in FIG. 2, the steam extraction line 130 includes an upstream steam line 131 for supplying steam extracted from the steam pipe 21A of the steam supply line 21 to the head end 24 side of the combustor 3, and a downstream steam line 132 for supplying the extracted steam to the turbine 2 side of the combustor 3.

The upstream steam line 131 includes an upstream steam pipe 131A for supplying the extracted steam between the head end 24 and the combustion liner 26, and an upstream steam flow control valve 131B disposed in the upstream steam pipe 131A. By controlling the opening degree of the upstream steam flow control valve 131B with a controller 90 described below; the upstream steam supply amount, which is the amount of steam introduced to the combustor 3 through the upstream steam pipe 131A, is adjusted. As the upstream steam supply amount increases, the effect of lowering the temperature of the flame zone increases, so that the amount of nitrogen oxides generated in the combustor 3 decreases. Therefore, it is preferable that the upstream steam supply amount is increased as the hydrogen gas fuel co-firing ratio increases. However, the upstream steam supply amount needs to be not more than the allowable upper limit supply amount to avoid disappearing of the flame 28 in the combustor 3. If the upstream steam supply amount exceeds the allowable upper limit supply amount, the oxygen concentration in the combustor 3 decreases significantly, increasing the possibility that the flame 28 will disappear.

The downstream steam line 132 includes a downstream steam pipe 132A for supplying the extracted steam to the downstream side of the combustion liner 26, and a downstream steam flow control valve 132B disposed in the downstream steam pipe 132A. By controlling the opening degree of the downstream steam flow control valve 132B with a controller 90 described below; the downstream steam supply amount, which is the amount of steam introduced to the combustor 3 through the downstream steam pipe 132A, is adjusted. As the total steam supply amount of the upstream and downstream steam supply to the combustor 3 increases, the flow rate of steam that flows into the turbine 2 to do work increases, and the output of the gas turbine 9, i.e., the power generation amount of the generator 5 increases. Conversely, as the total steam supply amount decreases, the output of the gas turbine 9 decreases as long as the fuel supply in the combustor 3 remains the same. The total steam supply amount of the upstream and downstream steam supply needs to be not more than the supply limit to avoid surging of the compressor 1. If the total steam supply exceeds the supply limit, the pressure at the outlet of the compressor 1 increases, increasing the possibility that surge will occurs in the compressor 1.

Referring to FIG. 1 again, although not essential components of the present disclosure, the steam extraction line 130 may further include a desuperheater 22 for lowering the temperature of steam extracted from the steam supply line 21. The desuperheater 22, disposed upstream of the upstream steam pipe 131A and the downstream steam pipe 132A in the steam flow direction, is configured such that, for example, part of boiler feedwater to be supplied to the heat recovery steam generator 14 flows in as cold water (see arrow B), and the cold water injected into the desuperheater 22 cools the steam. The cooled steam flows through the upstream steam pipe 131A and the downstream steam pipe 132A.

<Denitration Device 120>

As shown in FIG. 1, the cogeneration system 100 includes a denitration device 120 for denitration of the exhaust gas 13 by adding a reducing agent to the exhaust gas 13 flowing through the heat recovery steam generator 14. The reducing agent in this example is ammonia gas. The denitration device 120 injects the reducing agent into a denitration region R, which is a part of a flow path space for the exhaust gas 13 formed inside the heat recovery steam generator 14. More specifically, a catalyst is disposed in the denitration region R, and ammonia gas as the reducing agent is injected to the exhaust gas upstream of the catalyst, so that the exhaust gas and ammonia gas are mixed. Then, nitrogen oxides in the exhaust gas 13 are decomposed into water and nitrogen components by the ammonia catalytic reduction process using the catalyst.

The denitration device 120 includes a supply device 122 for supplying the reducing agent, a reducing agent supply conduit 124 connected to the supply device 122 and the heat recovery steam generator 14, a reducing agent supply flow control valve 126 disposed in the reducing agent supply conduit 124, and an injection nozzle 128 for injecting the reducing agent directed by the reducing agent supply conduit 124 into the denitration region R. One end portion of the reducing agent supply conduit 124 is disposed inside the heat recovery steam generator 14, and the injection nozzle 128 is provided at the one end of the reducing agent supply conduit 124. By controlling the opening degree of the reducing agent supply flow control valve 126 with a controller 90 described below; the flow rate of the reducing agent flowing through the reducing agent supply conduit 124 is adjusted, and the amount of the reducing agent added to the exhaust gas 13 is adjusted.

<Measuring Tool of Cogeneration System 100>

The cogeneration system 100 illustrated in FIG. 1 includes a generator output measuring tool 65 for measuring the amount of power generated by the generator 5, a compressor inlet air flow meter 64 for measuring the flow rate of the compressor inlet air 6 flowing into the compressor 1, a compressor inlet air pressure measuring tool 62 for measuring the pressure at the inlet of the compressor 1, a compressor outlet air pressure measuring tool 63 for measuring the pressure at the outlet of the compressor 1, a steam flow meter 66 for measuring the consumer steam supply amount, an upstream steam flow meter 67 for measuring the upstream steam supply amount, a downstream steam flow meter 68 for measuring the downstream steam supply amount, a turbine outlet NOx measuring tool 69 for measuring the amount of nitrogen oxides at the outlet of the turbine 2, and a heat recovery steam generator outlet NOx measuring tool 70 for measuring the amount of nitrogen oxides contained in the exhaust gas 13 discharged from the heat recovery steam generator 14. The measurement results of these measuring tools are all sent to a controller 90, which is a component of the cogeneration system 100 described later. Hereinafter, the compressor inlet air pressure measuring tool 62 and the compressor outlet air pressure measuring tool 63 may be collectively referred to as "air pressure measuring tool 61." The heat recovery steam generator outlet NOx measuring tool 70 and the turbine outlet NOx measuring tool 69 are configured to measure the concentration of NOx.

<Water Recovery System 40>

Figure 3:
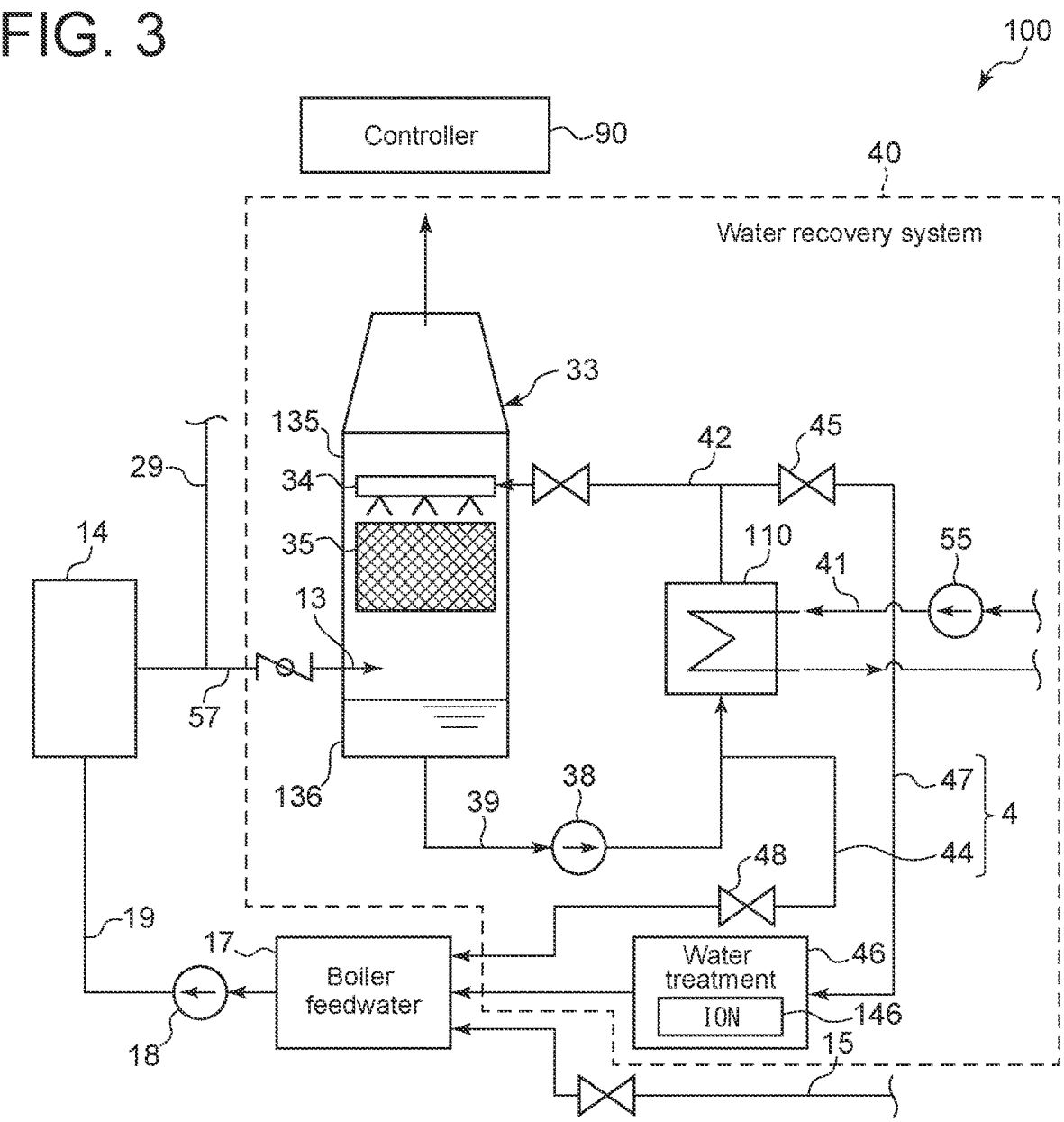
FIG. 3 is a schematic diagram of a water recovery system according to an embodiment.

FIG. 3 is a schematic diagram of the water recovery system 40 according to an embodiment of the present disclosure. The outline of the water recovery system 40 is as follows. A water recovery device 33, which is a component of the water recovery system 40, is configured to recover water in the exhaust gas 13 as recovered water by bringing the exhaust gas 13 introduced through the exhaust gas supply line 57 into gas-liquid contact with refrigerant water. As a more detailed example, the water recovery device 33 includes a heat exchange vessel 135 into which the exhaust gas 13 and refrigerant water flow, a spray device 34 for spraying refrigerant water inside the heat exchange vessel 135, and a packing material 35 disposed below the spray device 34 inside the heat exchange vessel 135. The exhaust gas 13 introduced through the exhaust gas supply line 57 flows into the heat exchange vessel 135. The refrigerant water sprayed by the spray device 34 adheres to the packing material 35 and exchanges heat with the exhaust gas 13 flowing into the heat exchange vessel 135. As a result, water in the exhaust gas 13 is condensed. Recovered water containing condensed water and refrigerant water that has undergone heat exchange falls and is stored in a water storage tank 136 that forms the lower part of the heat exchange vessel 135.

The water recovery system 40 includes a recovered water cooling device 110 for cooling recovered water discharged from the water storage tank 136 of the water recovery device 33, a recovered water discharge line 39 for directing recovered water discharged from the water storage tank 136 of the water recovery device 33 to the recovered water cooling device 110, and a recovered water supply line 42 for directing the cooled recovered water discharged from the recovered water cooling device 110 to the heat exchange vessel 135 as refrigerant water. The recovered water cooling device 110 in this example is configured to cool recovered water with cooling water, which may be seawater, for example. A cooling water supply line 41 for supplying cooling water to the recovered water cooling device 110 is provided with a cooling water supply pump 55.

The water recovery system 40 further includes a feedwater line 4 for directing recovered water to the feedwater tank 17. The feedwater line 4 includes a high temperature feedwater line 44 and a low temperature feedwater line 47. The high temperature feedwater line 44 is connected to the recovered water discharge line 39 and is configured to direct recovered water taken from the recovered water discharge line 39 to the feedwater tank 17. The recovered water taken from the recovered water discharge line 39 has heat recovered from the exhaust gas 13, and therefore has a relatively high temperature. The low temperature feedwater line 47 is connected to the recovered water supply line 42 and is configured to direct recovered water taken from the recovered water supply line 42 to the feedwater tank 17. The recovered water taken from the recovered water supply line 42 is cooled by the recovered water cooling device 110, and therefore has a relatively low temperature.

The low temperature feedwater line 47 is provided with a water treatment device 46, which is a component of the water recovery system 40. The water treatment device 46 is configured to apply a treatment to the recovered water flowing through the low temperature feedwater line 47 to remove impurities, such as sulfur, for example. Impurities are generated during combustion in the combustor 3 (see FIG. 1) and may be mixed in the exhaust gas 13. At least some of these impurities are dissolved in the recovered water by heat exchange between the exhaust gas 13 and refrigerant water in the water recovery device 33. The water treatment device 46 removes impurities from the recovered water, thereby reducing impurities in the boiler feedwater stored in the feedwater tank 17. In general, the lower the temperature of water to be treated, the higher the treatment capacity of the water treatment device 46 to remove impurities. If the temperature of the recovered water is higher, an ion exchange resin 146 that constitutes the water treatment device 46 may be damaged, and the treatment capacity of impurity removal may degrade.

The high temperature feedwater line 44 is provided with a high temperature feedwater open/close valve 48, and the low temperature feedwater line 47 is provided with a low temperature feedwater open/close valve 45, both of which are controlled by the controller 90 described above. For example, when the amount of the hydrocarbon gas fuel, which may be off gas, supplied to the combustor 3 is large (i.e., when the hydrogen gas fuel co-firing ratio is low), and the sulfur content in the exhaust gas 13 is higher than an allowable value and below an allowable upper limit value, the sulfur content mixed in the exhaust gas 13 increases, so the controller 90 closes the high temperature feedwater open/close valve 48 and opens the low temperature feedwater open/close valve 45. As a result, low-temperature recovered water, which requires impurity removal treatment, flows into the feedwater tank 17 via the water treatment device 46 disposed in the low temperature feedwater line 47. Thus, impurities are prevented from adhering to devices constituting the cogeneration system 100, such as the feedwater line 19 and the heat recovery steam generator 14, and the degradation of the cogeneration system 100 can be suppressed. On the other hand, when the hydrogen gas fuel co-firing ratio is relatively large, i.e., the sulfur content in the exhaust gas 13 is not more than the allowable value, the controller 90 opens the high temperature feedwater open/close valve 48 and closes the low temperature feedwater open/close valve 45. As a result, high-temperature recovered water, which requires no impurity removal treatment, flows into the feedwater tank 17 via the high temperature feedwater line 44. Since the temperature of boiler feedwater supplied from the feedwater tank 17 to the heat recovery steam generator 14 can be increased, the efficiency of the cogeneration system 100 is improved. As described above, the water recovery system 40 in this example makes it possible to switch the supply line of recovered water sent to the feedwater tank 17 according to the hydrogen gas fuel co-firing ratio.

<Configuration of Controller 90>

Figure 4:
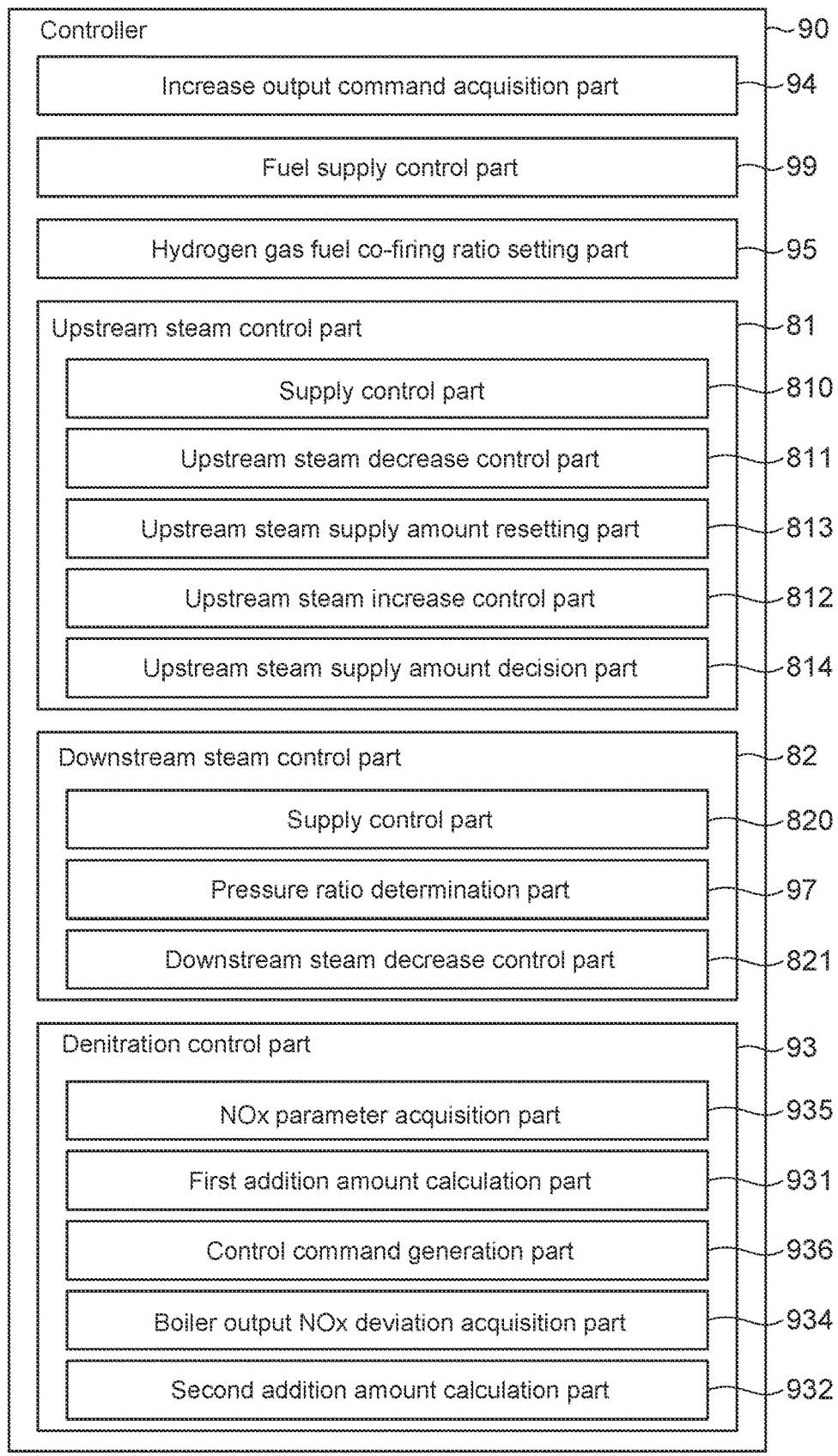
FIG. 4 is a schematic diagram of a controller according to an embodiment.

FIG. 4 is a schematic diagram of the controller 90 according to an embodiment of the present disclosure. The controller 90 comprises a computer, and includes a processor, a memory, and an external communication interface. The processor is, for example, CPU, GPU, MPU, DSP, or a combination of these. The processor according to another embodiment may be implemented by an integrated circuit of PLD, ASIC, FPGA, MCU, or the like. The memory is configured to temporarily or non-temporarily store various data, and is implemented by at least one of RAM, ROM, or flash memory. The processor executes various control processes in accordance with programs loaded in the memory. The controller 90 may be a DCS panel that constitutes one of multiple control panels that make up the cogeneration system 100.

The controller 90 with this hardware configuration performs control to denitrate the exhaust gas 13 generated in the combustor 3. More specifically, the controller 90 performs supply control of the upstream steam and supply control of the reducing agent. These controls are achieved, for example, by the controller 90 sending control signals to the first flow control valve 153, the second flow control valve 154, the upstream steam flow control valve 131B, the downstream steam flow control valve 132B, and the reducing agent supply flow control valve 126 to change or maintain the valve openings. Each flow valve is configured to detect its own opening degree after changing or maintaining the valve opening degree in response to the input control signal, and return the detection result to the controller 90.

The controller 90 includes an increase output command acquisition part 94 for acquiring an increase output command for increasing the amount of power generation which is the output of the cogeneration system 100, a fuel supply control part 99 for controlling the hydrogen gas fuel supply amount and the hydrocarbon gas fuel supply amount in accordance with the acquired increase output command, and a hydrogen gas fuel co-firing ratio setting part 95 for setting the hydrogen gas fuel co-firing ratio after the control by the fuel supply control part 99.

The increase output command acquisition part 94 acquires the increase output command, for example, while the hydrocarbon gas fuel and the hydrogen gas fuel are co-fired in the combustor 3. The fuel supply control part 99 in this example sends control signals to the first flow control valve 153 and the second flow control valve 154 so that the hydrogen gas fuel co-firing ratio increases in accordance with the increase output command. For example, a control signal for decreasing the opening degree of the first flow control valve 153 and a control signal for increasing the opening degree of the second flow control valve 154 are sent, thereby increasing the hydrogen gas fuel co-firing ratio. However, the present disclosure is not limited to the fact that the increase in the hydrogen gas fuel co-firing ratio is triggered by the acquisition of the increase output command. In another example, the control to increase the hydrogen gas fuel co-firing ratio may be performed when a command to reduce the carbon dioxide gas emissions of the cogeneration system 100 is acquired. The hydrogen gas fuel co-firing ratio setting part 95 sets (updates) the hydrogen gas fuel co-firing ratio to the current value after the control by the fuel supply control part 99. The set hydrogen gas fuel co-firing ratio is stored in the memory of the controller 90, and is referred to when calculating a NOx parameter described later.

The controller 90 further includes an upstream steam control part 81 for controlling the upstream steam line 131. The upstream steam control part 81 sends a control signal to the upstream steam flow control valve 131B to change the valve opening degree so that the actual amount of NOx emissions at the turbine outlet is not more than the turbine outlet target value. The turbine outlet target value is a value higher than the boiler outlet target value described above. The turbine outlet target value is decided as follows. First, the hydrogen gas fuel co-firing ratio is set, and the upstream steam supply amount is decided according to the hydrogen gas fuel co-firing ratio. The temperature of the flame 28 is calculated based on these two parameters, and the turbine outlet target value is decided based on a software module described below:

The upstream steam control part 81 includes a supply control part 810. The supply control part 810 decides the upstream steam supply amount, based on the turbine outlet target value, and controls the upstream steam flow control valve 131B so that the target upstream steam supply amount, which is the decided upstream steam supply amount, is achieved. For example, if the hydrogen gas fuel control part 92 updates the hydrogen gas fuel co-firing ratio to a higher value as a result of acquiring the increase output command, the amount of NOx produced in the combustor 3 increases, so the target upstream steam supply amount is set larger than the current upstream steam supply amount. The supply control part 810 then sends a control signal to the upstream steam flow control valve 131B to increase the opening degree.

Also, the upstream steam control part 81 is configured to satisfy a condition that the upstream steam supply amount is not more than the allowable upper limit supply amount to avoid misfire of the combustor 3. Specifically, the upstream steam control part 81 includes an upstream steam decrease control part 811 for decreasing the upstream steam supply amount if the upstream steam supply amount is determined to exceed the allowable upper limit supply amount. The upstream steam decrease control part 811 sends a control signal to the upstream steam flow control valve 131B to decrease the opening degree.

Also, the upstream steam control part 81 is configured to, if the target upstream steam supply amount, which is the upstream steam supply amount to set the amount of NOx emissions at the turbine outlet not more than the turbine outlet target value, is less than the allowable upper limit supply amount, control the upstream steam line so that the upstream steam supply amount exceeds the target upstream steam supply amount and is not more than the allowable upper limit supply amount.

Specifically, the upstream steam control part 81 includes an upstream steam supply amount resetting part 813 for resetting the upstream steam supply amount to a predetermined supply amount that exceeds the target upstream steam supply amount and is not more than the allowable upper limit supply amount if the target upstream steam supply amount is less than the allowable upper limit supply amount. The upstream steam supply amount resetting part 813 in this example sets the upstream steam supply amount to a value close to the allowable upper limit supply amount and sends a control signal to the upstream steam flow control valve 131B to increase the opening degree. As a result, the actual upstream steam supply amount increases to the reset upstream steam supply amount, which exceeds the initial target upstream steam supply amount.

Additionally, the upstream steam control part 81 includes an upstream steam increase control part 812 for increasing the upstream steam supply amount if the actual amount of NOx emissions is determined to exceed the turbine outlet target value. The upstream steam increase control part 812 sends a control signal to the first flow control valve 153 to increase the opening degree. The upstream steam control part 81 further includes an upstream steam supply amount decision part 814 for deciding the final upstream steam supply amount. The upstream steam supply amount decision part 814 acquires the actual upstream steam supply amount at the timing when the actual amount of NOx emissions is determined to be not more than the turbine outlet target value, based on at least one of measurement results of the upstream steam flow meter 67 or measurement results of the opening degree of the upstream steam flow control valve 131B. The acquired actual upstream steam supply amount is decided as the final upstream steam supply amount and stored in the memory of the controller 90. This upstream steam supply amount is referred to when calculating a NOx parameter described below:

The controller 90 further includes a downstream steam control part 82 for controlling the downstream steam line 132. The downstream steam control part 82 includes a supply control part 820 for controlling the downstream steam flow control valve 132B so that the output of the increase output command acquired by the increase output command acquisition part 94 is achieved. As described above, the total steam supply amount of the upstream and downstream steam supply contributes to the increase in the output of the gas turbine 9. However, there are restrictions on the control of the upstream steam supply amount considering the allowable upper limit supply amount and the amount of denitration required in the combustor 3. Therefore, in the present embodiment, after the final upstream steam supply amount is decided, the shortage of steam to be supplied to the turbine 2 is covered by the downstream steam supply control by the supply control part 820.

Further, the downstream steam control part 82 is configured to control the downstream steam line 132 while satisfying a condition that the total steam supply amount, which is the sum of the upstream steam supply amount decided by the upstream steam supply amount decision part 814 and the downstream steam supply amount, is not more than the supply limit to prevent the compressor 1 from surging. When the total steam supply amount reaches the supply limit, the pressure ratio of the compressor 1 reaches the allowable upper pressure ratio to avoid the surging. It is thus preferred that the total steam supply amount is not more than the supply limit.

Therefore, the downstream steam control part 82 further includes a pressure ratio determination part 97 configured to determine whether the pressure ratio calculated based on measurement results of the air pressure measuring tool 61 for measuring the pressure ratio of the compressor 1 is not more than the allowable upper limit pressure ratio, and a downstream steam decrease control part 821 for decreasing the downstream steam supply amount if the pressure ratio exceeds the allowable upper limit pressure ratio. The downstream steam decrease control part 821 sends a control signal to the downstream steam flow control valve 132B to decrease the opening degree.

The controller 90 further includes a denitration control part 93 for outputting a control command to the denitration device 120 so that the amount of NOx emissions at the heat recovery steam generator outlet is not more than the boiler outlet target value.

The denitration control part 93 includes a NOx parameter acquisition part 935 for acquiring a NOx parameter, which is a parameter that correlates with the amount of NOX emissions at the outlet of the turbine 2 (turbine outlet). The NOx parameter in this example is an estimated value of NOx emissions at the turbine outlet (hereinafter also referred to as "estimated amount of NOx emissions"), which is obtained by calculation based on the hydrogen gas fuel co-firing ratio, the head end steam injection ratio, and the temperature of the flame 28. The estimated amount of NOx emissions may be treated as the target value for NOx emissions at the turbine outlet.

The head end steam injection ratio is the proportion of the upstream steam supply amount in the flow rate of the compressor inlet air 6. The flow rate of the compressor inlet air 6 can be identified based on measurement results of the air pressure measuring tool 61 and the compressor inlet air flow meter 64. The temperature of the flame 28 may be an estimated value determined by calculation based on the hydrogen gas fuel supply amount, the hydrocarbon gas fuel supply amount, and the flow rate of the compressor inlet air 6.

Figure 5:
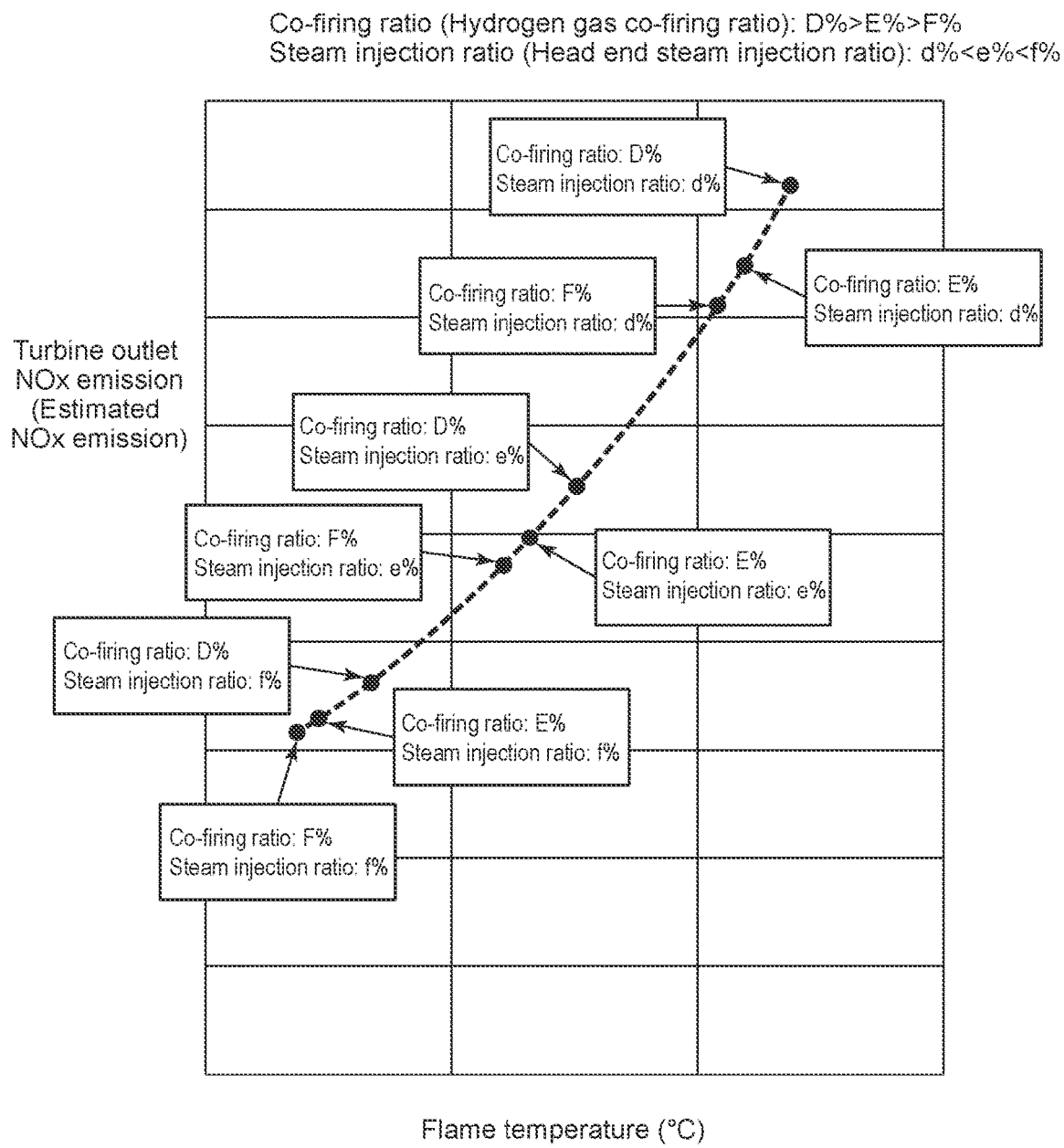
FIG. 5 is a schematic diagram showing NOx emission characteristics at the turbine outlet.

FIG. 5 is a schematic diagram showing NOx emission characteristics at the turbine outlet and shows NOx emission characteristics determined by experiment. As illustrated in the figure, the steam injection ratio (the head end steam injection ratio, which is the proportion of the upstream steam supply amount in the flow rate of the compressor inlet air 6), the hydrogen gas fuel co-firing ratio, the temperature of the flame 28, and the amount of NOx generated in the combustor 3 have defined relationships with each other. In this embodiment, the amount of NOx emissions on the vertical axis of the graph is treated as the estimated amount of NOx emissions. Specifically, the relationship shown in this figure is stored in software module as a function equation, data table, or training model, so that the NOx parameter acquisition part 935 can acquire the NOx parameter as the estimated amount of NOx emissions. The software module is a computing device that stores a function equation, data table, or training model that has been machine learned, and the computing device may be incorporated into the controller 90. The steam injection ratio, the hydrogen gas fuel co-firing ratio, and the temperature of the flame 28 are input to the software module as the input parameters, and the NOx parameter acquisition part 935 acquires the estimated amount of NOx emissions output from the software module as the output parameter.

Figure 6:
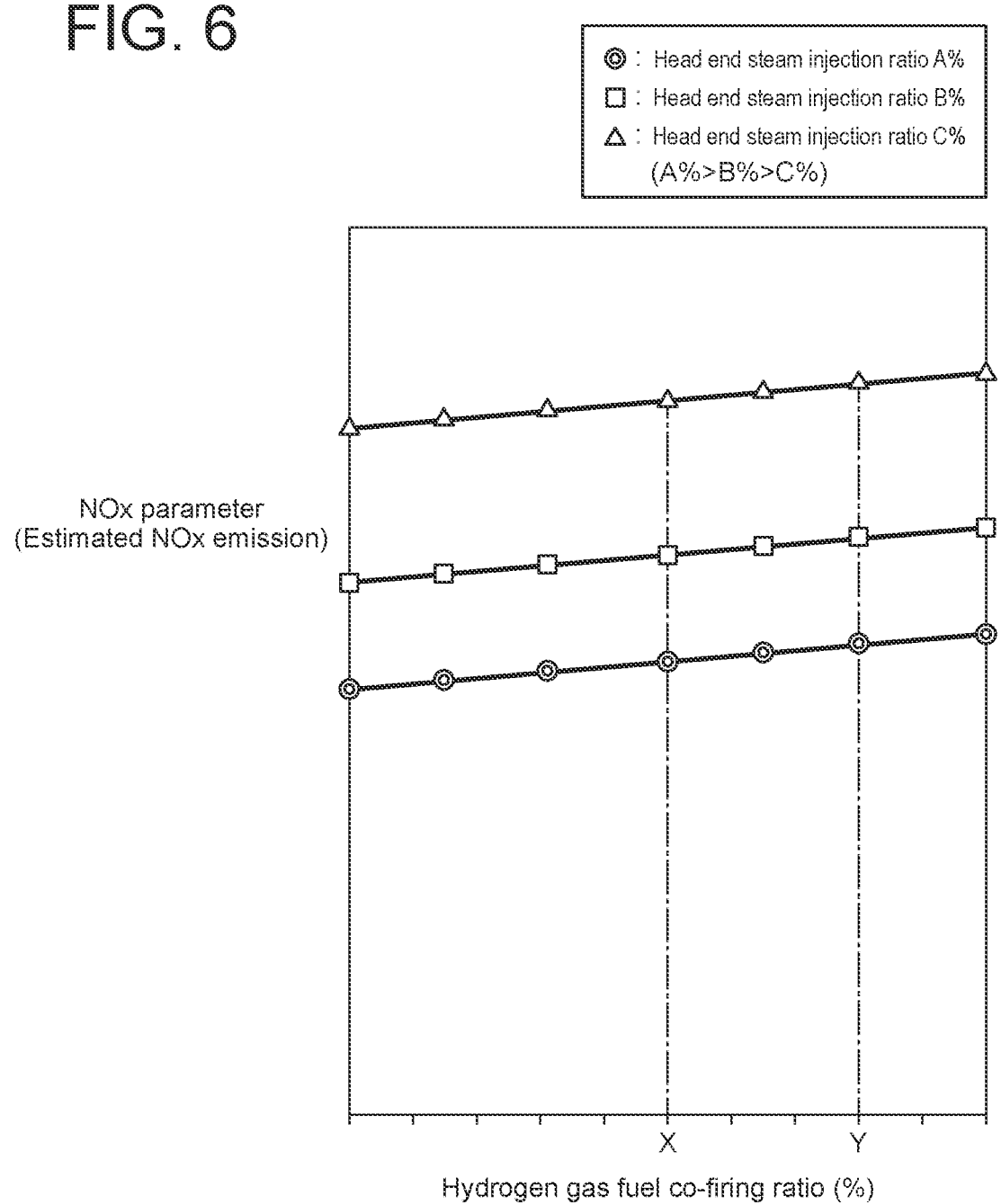
FIG. 6 is a schematic diagram showing NOx parameter characteristics.

FIG. 6 is a schematic diagram showing NOx emission (estimated NOx emission) characteristics according to an embodiment of the present disclosure. In this figure, the predictive characteristics of NOx parameter are shown in a graph created based on experimental results (the same applies to FIG. 7). As shown in the figure, the NOx parameter decreases as the head end steam injection ratio increases, and the NOx parameter increases as the hydrogen gas fuel co-firing ratio increases. The A % of the head end steam injection ratio is the steam injection ratio corresponding to the above-described allowable upper limit supply amount.

Figure 7:
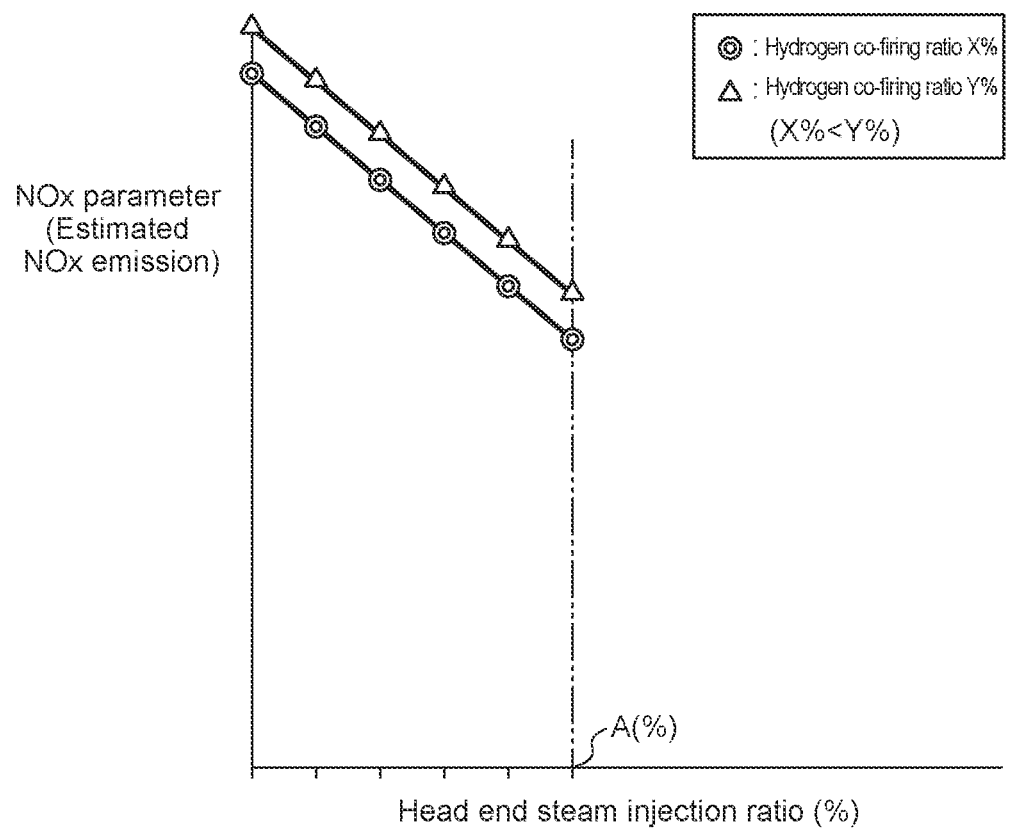
FIG. 7 is another schematic diagram showing NOx parameter characteristics.

FIG. 7 is another schematic diagram showing NOx emission (estimated NOx emission) characteristics according to an embodiment of the present disclosure. As shown in the figure, regardless of the hydrogen gas fuel co-firing ratio, as the head end steam injection ratio is increased, the NOx parameter decreases, and the amount of the reducing agent (ammonia) required to be added for denitration in the denitration device 120 decreases. Further, as shown in the figure, the head end steam injection ratio (A %), which corresponds to the allowable upper limit supply amount, is the same regardless of the hydrogen gas fuel co-firing ratio. This is because the head end steam injection ratio (A %) is the injection ratio determined for combustion stability and is determined by the water vapor and oxygen partial pressures in the combustion zone, and the effect of the gas components to be oxidized is small.

Referring to FIG. 4 again, the denitration control part 93 includes a first addition amount calculation part 931 for acquiring (calculating) the first addition amount of the reducing agent by calculation based on the NOx parameter, and a control command generation part 936 for outputting a control command to the reducing agent supply flow control valve 126 of the denitration device 120 with reference to at least the calculated first addition amount. The calculation performed by the first addition amount calculation part 931 is feedforward calculation based on the NOx parameter acquired by the NOx parameter acquisition part 935, and the control command generated by the control command generation part 936 is a feedforward control command.

The first addition amount calculated based on the NOx parameter at the turbine outlet upstream of the heat recovery steam generator 14 indicates the amount of the reducing agent (the amount of ammonia supplied for denitration) required in the future for the denitration device 120. With the configuration in which the denitration control part 93 generates a feedforward control command, the control command generation part 936 of the denitration control part 93 generates a control command input to the reducing agent supply flow control valve 126 as a feedforward control command with reference to the first addition amount of the reducing agent based on the NOx parameter. This allows the denitration device 120 to start the operation to denitrate NOx before NOx generated in the turbine 2 reaches the denitration region R inside the heat recovery steam generator 14. Accordingly, the cogeneration system 100 is realized whereby it is possible to perform the denitration operation quickly following the increase in the amount of NOx emissions from the gas turbine 9 when the hydrogen gas fuel co-firing ratio in the gas turbine 9 increases.

The NOx parameter is not limited to the estimated amount of NOx emissions. For example, the NOx parameter may be the actual amount of NOx emissions measured by the turbine outlet NOx measuring tool 69. Even in this case, the aforementioned advantages are achieved if the first addition amount calculation part 931 executes the feedforward calculation based on the amount of NOx emissions to calculate the first addition amount.

Further, according to the embodiment in which the NOx parameter is the estimated amount of NOx emissions, it is also possible to calculate the estimated amount of NOx emissions at the time when a control command (valve opening command) to control the hydrogen gas fuel supply amount and the upstream steam supply amount is generated. Before the supply of the hydrogen gas fuel and the upstream steam in the amount indicated by this control command actually starts, the control command generation part 936 of the denitration control part 93 can generate the control command input to the denitration device 120 with reference to the first addition amount of denitration agent. Therefore, the denitration device 120 can perform the denitration operation that quickly follows the increase in the amount of NOx discharged from the gas turbine 9.

The denitration control part 93 shown in FIG. 4 is further configured to perform feedback control on the addition amount of the reducing agent. Specifically, the denitration control part 93 further includes a boiler outlet NOx deviation acquisition part 934 for acquiring a boiler outlet NOx deviation, which is the deviation between the boiler outlet target value and the actual amount of NOx emissions at the heat recovery steam generator outlet determined by measurement with the heat recovery steam generator outlet NOx measuring tool 70, and a second addition amount calculation part 932 for acquiring (calculating) the second addition amount of the reducing agent by calculation based on the boiler outlet NOx deviation acquisition part 934. The calculation performed by the second addition amount calculation part 932 is feedback calculation. The boiler outlet target value is a value that reflects a certain degree of margin in the regulation value in the area where the cogeneration system 100 is installed, and is a constant value.

The control command generation part 936 is configured to generate a control command with reference to the second addition amount, in addition to generating the control command with reference to the first addition amount. The control command generated based on the second addition amount is a feedback control command, which is a control signal for the valve opening input to the reducing agent supply flow control valve 126. With the configuration in which the control command generation part 936 generates a feedback control command, it is possible to ensure that the amount of NOx emissions at the heat recovery steam generator outlet is not more than the boiler outlet target value.

Additionally, with the configuration in which the upstream steam control part 81 controls the upstream steam line 131 while satisfying a condition that the upstream steam supply amount is not more than the allowable upper limit supply amount, it is possible to suppress misfire in the combustor 3 due to the upstream steam supply amount exceeding the allowable upper limit supply amount.

Additionally, with the configuration in which the upstream steam control part 81 includes the upstream steam supply amount resetting part 813, the upstream steam supply amount to the head end 24 side of the combustor 3 can be increased while avoiding misfire in the combustor 3. Since the denitration amount in the combustor 3 can be increased to the maximum extent, the denitration amount in the denitration device 120 can be reduced, and the addition amount of the reducing agent can be reduced.

Additionally, with the configuration in which the downstream steam control part 82 controls the downstream steam line 132 while satisfying a condition that the total steam supply amount is not more than the supply limit to prevent the compressor 1 from surging, after deciding the upstream steam supply amount to set the amount of NOx emissions not more than the turbine outlet target value, the downstream steam control part 82 controls the downstream steam supply amount while satisfying a condition that the total steam supply amount is not more than the supply limit. This makes it possible to increase the denitration amount in the combustor 3 while avoiding surging of the compressor 1.

As the hydrogen gas fuel co-firing ratio increases, the amount of water contained in the combustion gas 12 discharged from the gas turbine 9 increases. In this regard, with the configuration in which the cogeneration system 100 includes the water recovery system 40 and the feedwater tank 17, water in the exhaust gas 13 at the gas turbine outlet consists of water in the compressor inlet air 6 of the compressor 1, water from the steam injection in the gas turbine 9, and water generated by combustion. The water in the compressor inlet air 6 is discharged out of the system through the exhaust tower 30 or the outlet of the water recovery device 33, while the steam injected water and the combustion produced water are recovered in the water recovery system 40. The steam injected water is reused as boiler feedwater, and the combustion produced water becomes surplus water, so the cogeneration system 100 can function as a water plant.

<Method of Operating Cogeneration System 100>

Figure 8:
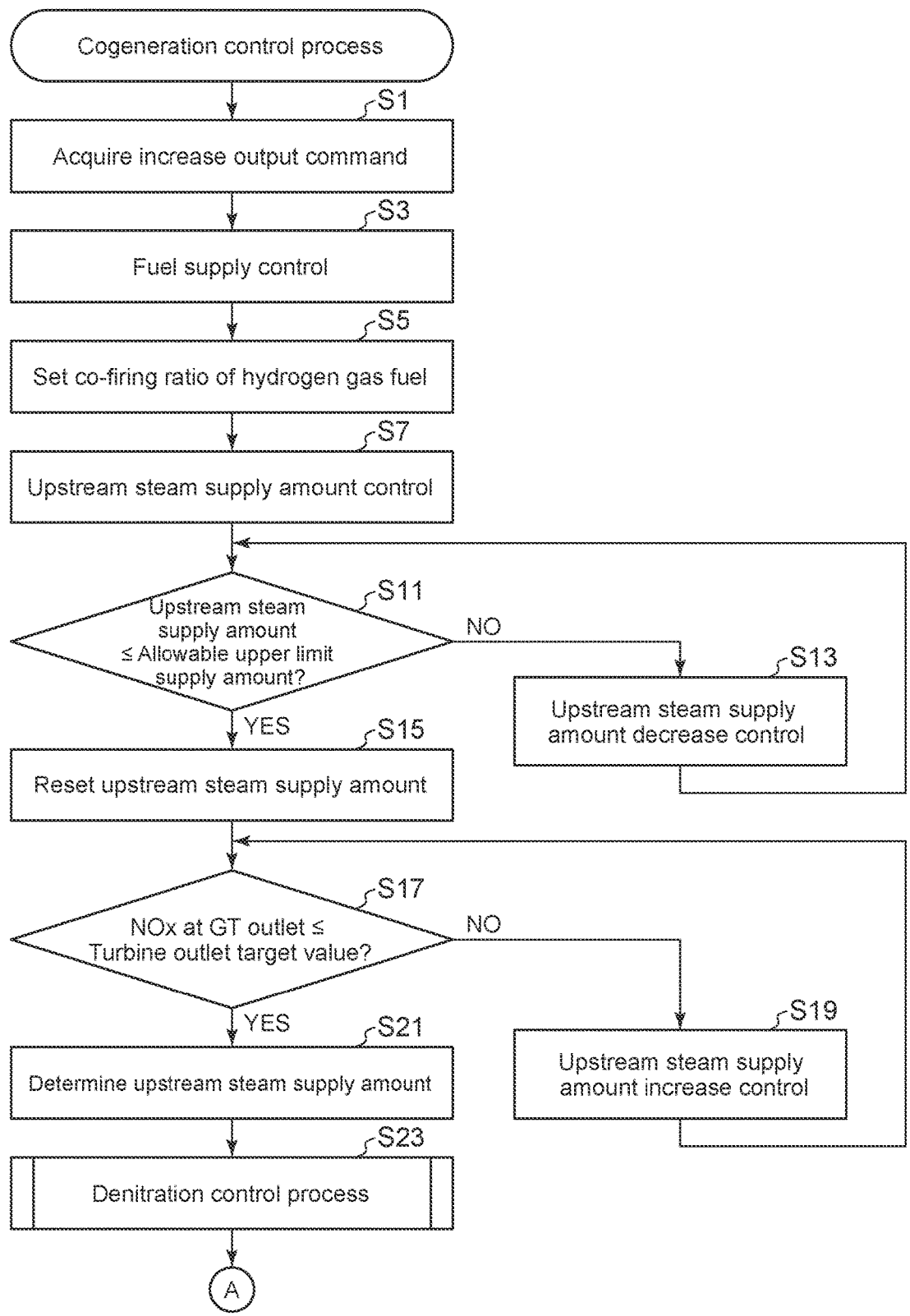
FIG. 8 is a flowchart of the cogeneration system control process according to an embodiment.
Figure 9:
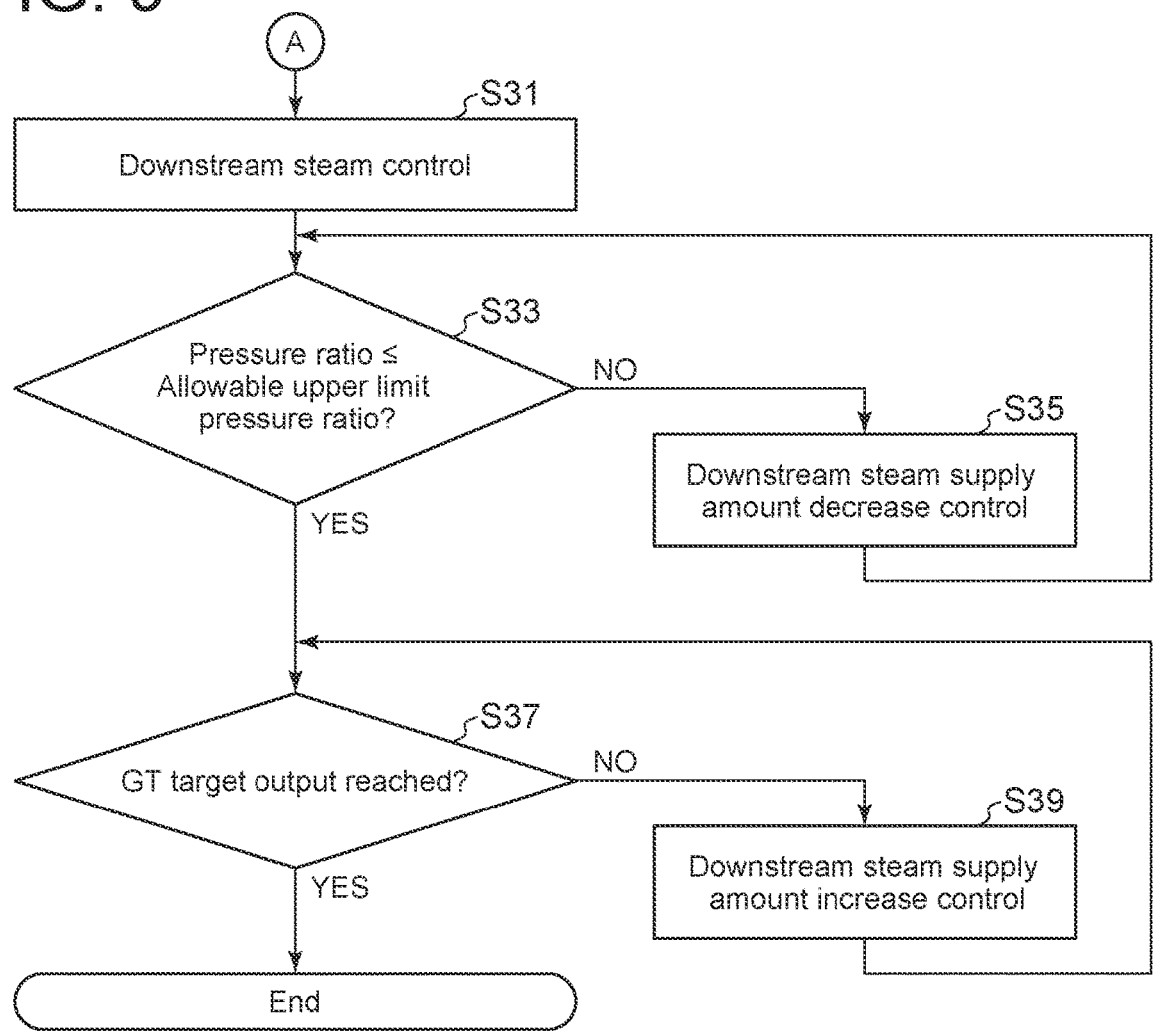
FIG. 9 is a flowchart of the cogeneration system control process following FIG. 8.

FIGS. 8 and 9 are flowcharts of the cogeneration system control process according to an embodiment of the present disclosure and shows an example of the method of operating the cogeneration system 100. The cogeneration system control process is to change the upstream steam supply amount and the reducing agent supply amount when the hydrogen gas fuel co-firing ratio increases. This control process is executed by the processor of the controller 90. In the following description, "processor of controller 90" may be abbreviated as "processor," and "step" may be abbreviated as "S." Note that co-firing of the hydrocarbon gas fuel and the hydrogen gas fuel has already occurred in the combustor 3 before the cogeneration system control process is started.

First, the processor acquires an increase output command (S1). The processor executing S1 is an example of the increase output command acquisition part 94. Then, the processor controls the hydrogen gas fuel supply amount and the hydrocarbon gas fuel supply amount in accordance with the increase output command acquired in S1 (S3). Specifically, control signals for the valve opening degree corresponding to the output increase command are sent to the first flow control valve 153 and the second flow control valve 154. In this example, a control signal to decrease the opening degree of the first flow control valve 153 and a control signal to increase the opening degree of the second flow control valve 154 are sent, thereby increasing the hydrogen gas fuel co-firing ratio. The processor executing S3 is an example of the fuel supply control part 99.

Then, the processor sets the hydrogen gas fuel co-firing ratio (S5). For example, the hydrogen gas fuel co-firing ratio is calculated based on the opening degree of the first flow control valve 153, the opening degree of the second flow control valve 154, the measurement results of the first flow meter 71, and the measurement results of the second flow meter 72 after S3 is executed, and the processor stores the calculated hydrogen gas fuel co-firing ratio in the memory of the controller 90 (S5). The processor executing S5 is an example of the hydrogen gas fuel co-firing ratio setting part 95.

Then, the processor controls the upstream steam supply amount (S7). The processor executing S7 is an example of the supply control part 810. Then, the processor determines whether the upstream steam supply amount is not more than the allowable upper limit supply amount, for example, based on measurement results of the upstream steam flow meter 67. If it is determined that the upstream steam supply amount exceeds the allowable upper limit supply amount (S11: NO), the processor performs control to decrease the upstream steam supply amount (S13). The processor executing S13 is an example of the upstream steam decrease control part 811.

If it is determined that the upstream steam supply amount is not more than the allowable upper limit supply amount (S11: YES), the processor resets the upstream steam supply amount to a value larger than the current upstream steam supply amount measured by the upstream steam flow meter 67 (S15). Then, the processor sends a control signal to the upstream steam flow control valve 131B so that the reset upstream steam supply amount is achieved. As a result, the upstream steam supply amount increases (however, this upstream steam supply amount is not more than the allowable upper limit supply amount). The processor executing S15 is an example of the upstream steam supply amount resetting part 813.

Then, the processor determines whether the actual amount of NOx emissions at the turbine outlet is not more than the turbine outlet target value (S17). For example, the amount of NOx measured by the turbine outlet NOx measuring tool 69 is compared with the turbine outlet target value to determine the magnitude relationship. If it is determined that the actual amount of NOx emissions exceeds the turbine outlet target value (S17: NO), the processor performs control to increase the upstream steam supply amount (S19). However, the upstream steam supply amount after the increase is still not more than the allowable upper limit supply amount. The processor executing S19 is an example of the upstream steam increase control part 812.

If it is determined that the actual amount of NOx emissions at the turbine outlet is not more than the turbine outlet target value (S17: YES), the processor decides the upstream steam supply amount at the determination timing (S21). More specifically, based on the upstream steam flow meter 67 and the opening degree of the upstream steam flow control valve 131B at that timing, the upstream steam supply amount is decided, and this upstream steam supply amount is stored in the memory of the controller 90 (S21). The processor executing S21 is an example of the upstream steam supply amount decision part 814.

Then, the processor performs denitration control for controlling the denitration device 120 (S23). The processor executing S23 is an example of the denitration control part 93. The details of the denitration control will be described below.

As shown in FIG. 9, the processor controls the downstream steam supply amount (S31). Specifically, the downstream steam flow control valve 132B is controlled so that the increase output command acquired in S1 is achieved. The processor executing S31 is an example of the supply control part 820.

Then, the processor determines whether the pressure ratio is not more than the allowable upper limit pressure ratio (S33). The processor executing S33 is an example of the pressure ratio determination part 97. If it is determined that the pressure ratio exceeds the allowable upper limit pressure ratio (S33: NO), the processor performs control to decrease the downstream steam supply amount (S35). The processor executing S35 is an example of the downstream steam decrease control part 821. If it is determined that the pressure ratio is not more than the allowable upper limit pressure ratio (S33: YES), the processor determines whether the output of the gas turbine 9 has reached the target output indicated by the increase output command acquired in S1 (S37). If it is determined that the amount of power generation measured by the generator output measuring tool 65 has not reached the target power generation amount (S37: NO), the processor performs control to increase the downstream steam supply amount (S39). In S39, a control signal to increase the valve opening degree is sent to the downstream steam flow control valve 132B. If it is determined that the measured power generation amount has reached the target power generation amount (S37: YES), the processor ends the cogeneration system control process.

Figure 10:
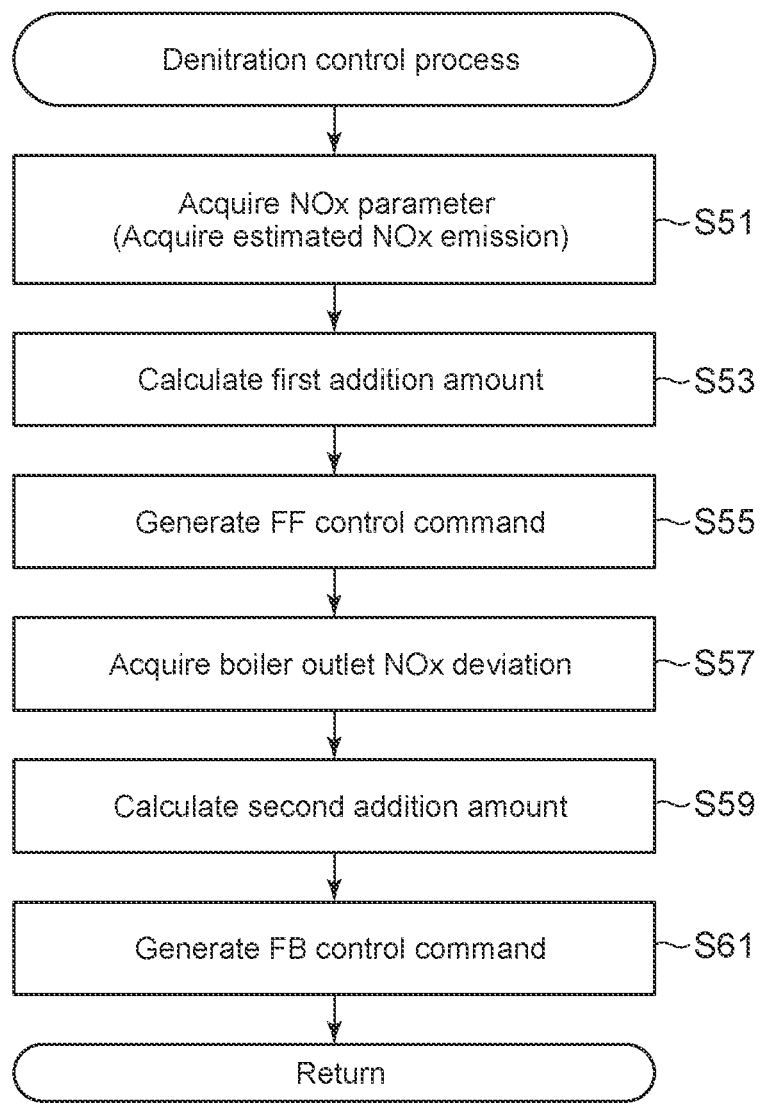
FIG. 10 is a flowchart of a denitration control process according to an embodiment.

The denitration control process will be described with reference to FIG. 10. The denitration control process is a process to control the denitration operation by the denitration device 120. The processor acquires a NOx parameter, based on the hydrogen gas fuel co-firing ratio set in S5 and the upstream steam supply amount decided in S21 (S51). More specifically, the steam injection ratio based on the upstream steam supply amount and the flow rate of the compressor inlet air 6, the hydrogen gas fuel co-firing ratio, and the temperature of the flame 28 are input to the software module to obtain the estimated amount of NOx emissions. The processor executing S51 is an example of the NOx parameter acquisition part 935.

The processor calculates the first addition amount by feedforward calculation based on the NOx parameter acquired in S51 (S53). The processor executing S53 is an example of the first addition amount calculation part 931. Then, the processor generates a control command indicating the valve opening degree corresponding to the first addition amount as a feedforward control command and sends it to the reducing agent supply flow control valve 126 (S55).

Then, the processor acquires a boiler outlet NOx deviation (S57). The processor executing S57 is an example of the boiler outlet NOx deviation acquisition part 934. Further, the processor determines the second addition amount to set the boiler outlet NOx deviation acquired in S57 to zero or a value that can be considered as zero by feedback calculation (S59). The processor executing S59 is an example of the second addition amount calculation part 932. Then, the processor generates a control command indicating the valve opening degree corresponding to the second addition amount as a feedback control command and sends it to the reducing agent supply flow control valve 126 (S61). The processor executing S55 and S61 is an example of the control command generation part 936. Thereafter, the processor ends the deviation control process.

<Conclusion>

The contents described in some embodiments described above would be understood as follows, for instance.

1) A gas turbine cogeneration system (100) according to at least one embodiment of the present disclosure includes: a gas turbine (9) including a compressor (1), a combustor (3), and a turbine (2); a hydrocarbon fuel supply facility (51) for supplying hydrocarbon gas fuel to the combustor; a hydrogen gas fuel supply facility (52) for supplying hydrogen gas fuel which is fuel mainly composed of hydrogen gas to the combustor; a heat recovery steam generator (14) for generating steam using exhaust gas discharged from the turbine; an upstream steam line (131) for supplying the steam discharged from the heat recovery steam generator (14) to a head end (24) side of the combustor; a denitration device (120) for denitration of the exhaust gas by adding a reducing agent (ammonia gas) to the exhaust gas flowing through the heat recovery steam generator; and a denitration control part (93) for outputting to the denitration device a control command to set the amount of NOx emissions at the heat recovery steam generator outlet not more than a boiler outlet target value. The denitration control part is configured to generate the control command with reference to at least a first addition amount of the reducing agent obtained by calculation based on a NOx parameter which is a parameter correlated with the amount of NOx emissions at the turbine outlet.

Once the amount of NOx emissions at the outlet of the turbine upstream of the heat recovery steam generator is known, the amount of denitration required for the denitration device in the future can be identified. With the above configuration 1), since the denitration control part generates the control command with reference to the first addition amount of the reducing agent based on the NOx parameter, the denitration device can start the operation to denitrate NOx before NOx generated in the turbine reaches the denitration region inside the heat recovery steam generator. Thus, the gas turbine cogeneration system is realized whereby it is possible to perform the denitration operation quickly following the increase in the amount of NOx emissions from the gas turbine when the hydrogen gas fuel co-firing ratio in the gas turbine increases.

2) In some embodiments, in the gas turbine cogeneration system as defined in the above 1), the denitration control part is configured to generate the control command with reference to a second addition amount of the reducing agent obtained by calculation based on a deviation between the boiler outlet target value and the amount of NOx emissions at the heat recovery steam generator outlet determined by measurement.

With the above configuration 2), since the denitration control part generates the control command with reference to the second addition amount of the reducing agent based on the deviation between the boiler outlet target value of NOx emissions at the heat recovery steam generator outlet and the amount of NOx emissions at the heat recovery steam generator outlet determined by measurement, it is possible to ensure that the amount of NOx emissions at the heat recovery steam generator outlet is not more than the boiler outlet target value.

3) In some embodiments, in the gas turbine cogeneration system as defined in the above 1) or 2), the NOx parameter is an estimated amount of NOx emissions at the turbine outlet obtained by calculation based on a hydrogen gas fuel supply amount which is the amount of the hydrogen gas fuel supplied by the hydrogen gas fuel supply facility and an upstream steam supply amount which is the amount of the steam supplied by the upstream steam line.

With the above configuration 3), it is possible to calculate the estimated amount of NOx emissions at the time when control commands to control the hydrogen gas fuel supply amount and the upstream steam supply amount are generated. Before the supply of the hydrogen gas fuel and the upstream steam in the amount indicated by this control command actually starts, the denitration control part can generate the control command with reference to the first addition amount of denitration agent based on the estimated amount of NOx emissions. Therefore, the denitration device can perform the denitration operation that quickly follows the increase in the amount of NOx discharged from the gas turbine.

4) In some embodiments, the gas turbine cogeneration system as defined in any of the above 1) to 3) further includes an upstream steam control part (81) for controlling the upstream steam line so that the actual amount of NOx emissions at the turbine outlet is not more than a turbine outlet target value that is higher than the boiler outlet target value, while satisfying a condition that an upstream steam supply amount which is the amount of the steam supplied by the upstream steam line is not more than an allowable upper limit supply amount.

With the above configuration 4), it is possible to suppress misfire in the combustor of the gas turbine due to the upstream steam supply amount exceeding the allowable upper limit supply amount.

5) In some embodiments, in the gas turbine cogeneration system as defined in the above 4), the upstream steam control part is configured to, if a target upstream steam supply amount which is the upstream steam supply amount to set the amount of NOx emissions at the turbine outlet not more than the turbine outlet target value is less than the allowable upper limit supply amount, control the upstream steam line so that the upstream steam supply amount exceeds the target upstream steam supply amount and is not more than the allowable upper limit supply amount.

With the above configuration 5), since the upstream steam supply amount is set to a value not more than the allowable upper limit supply amount, the target upstream steam supply amount, the flow rate of the steam flowing into the combustor can be increased while avoiding misfire in the combustor. Since the denitration amount in the combustor can be increased, the denitration amount in the denitration device can be reduced, and the addition amount of the reducing agent can be reduced.

6) In some embodiments, in the gas turbine cogeneration system as defined in the above 4) or 5), the upstream steam control part has an upstream steam supply amount decision part (814) for deciding the upstream steam supply amount to set the actual amount of NOX emissions at the turbine outlet not more than the turbine outlet target value. The gas turbine cogeneration system further includes: a downstream steam line (132) for supplying the steam discharged from the heat recovery steam generator to a turbine side of the combustor that is closer to the turbine than the head end; and a downstream steam control part (82) for controlling the downstream steam line while satisfying a condition that a total steam supply amount which is the sum of a downstream steam supply amount which is the amount of the steam supplied by the downstream steam line and the upstream steam supply amount decided by the upstream steam supply amount decision part is not more than a supply limit to prevent the compressor from surging.

With the above configuration 6), after deciding the upstream steam supply amount to set the amount of NOx emissions not more than the turbine outlet target value, the downstream steam control part controls the downstream steam supply amount while satisfying a condition that the total steam supply amount is not more than the supply limit. This makes it possible to increase the denitration amount in the combustor while avoiding surging of the compressor.

7) In some embodiments, the gas turbine cogeneration system as defined in any of the above 1) to 4) further includes: a water recovery system (40) for recovering water from the exhaust gas by heat exchange between the exhaust gas from the heat recovery steam generator and refrigerant water; and a feedwater tank (17) for storing boiler feedwater for supplying recovered water recovered by the water recovery system to the heat recovery steam generator.

As the hydrogen gas fuel co-firing ratio increases, the amount of water contained in the combustion gas discharged from the gas turbine increases. In this regard, with the above configuration 7), water recovered from the exhaust gas by the water recovery system can be recycled as boiler feedwater supplied to the heat recovery steam generator, so the gas turbine cogeneration system also functions as a water plant.

8) A method of operating a gas turbine cogeneration system (100) according to at least one embodiment of the present disclosure, the gas turbine cogeneration system comprising: a gas turbine (9) including a compressor (1), a combustor (3), and a turbine (2); a hydrocarbon fuel supply facility (51) for supplying hydrocarbon gas fuel to the combustor: a hydrogen gas fuel supply facility (52) for supplying hydrogen gas fuel which is fuel mainly composed of hydrogen gas to the combustor: a heat recovery steam generator (14) for generating steam using exhaust gas discharged from the turbine: an upstream steam line (131) for supplying the steam discharged from the heat recovery steam generator to a head end side of the combustor; and a denitration device (120) for denitration of the exhaust gas by adding a reducing agent (ammonia gas) to the exhaust gas flowing through the heat recovery steam generator, includes a denitration control step (S23) of outputting to the denitration device a control command to set the amount of NOx emissions at a heat recovery steam generator outlet not more than a boiler outlet target value. The denitration control step includes generating the control command with reference to at least a first addition amount of the reducing agent obtained by calculation based on a NOx parameter which is a parameter correlated with the amount of NOx emissions at a turbine outlet.

With the above configuration 8), for the same reason as the above 1), the gas turbine cogeneration system is realized whereby it is possible to perform the denitration operation quickly following the increase in the amount of NOx emissions from the gas turbine when the hydrogen gas fuel co-firing ratio in the gas turbine increases.

The invention claimed is:
1. A gas turbine cogeneration system, comprising:
a gas turbine including a compressor, a combustor, and a turbine;
a hydrocarbon fuel supply facility for supplying hydrocarbon gas fuel to the combustor;
a hydrogen gas fuel supply facility for supplying hydrogen gas fuel which is fuel mainly composed of hydrogen gas to the combustor;
a heat recovery steam generator for generating steam using exhaust gas discharged from the turbine;
an upstream steam line for supplying the steam discharged from the heat recovery steam generator to a head end side of the combustor;
a denitration device for denitration of the exhaust gas by adding a reducing agent to the exhaust gas flowing through the heat recovery steam generator; and
a denitration control part for outputting to the denitration device a control command to set an amount of NOx emissions at a heat recovery steam generator outlet not more than a boiler outlet target value,
wherein the denitration control part is configured to generate the control command as a feedforward control command based on a first addition amount of the reducing agent obtained by feedforward calculation based on a NOx parameter which is a parameter correlated with the amount of NOx emissions at a turbine outlet, and is configured to generate the control command as a feedback control command based on a second addition amount of the reducing agent obtained by feedback calculation based on a deviation between the boiler outlet target value and the amount of NOx emissions at the heat recovery steam generator outlet determined by measurement.

2. The gas turbine cogeneration system according to claim 1,
wherein the denitration control part is configured to generate the control command with reference to a second addition amount of the reducing agent obtained by calculation based on a deviation between the boiler outlet target value and the amount of NOx emissions at the heat recovery steam generator outlet determined by measurement.

3. The gas turbine cogeneration system according to claim 1, further comprising:
a water recovery system for recovering water from the exhaust gas by heat exchange between the exhaust gas from the heat recovery steam generator and refrigerant water; and
a feedwater tank for storing boiler feedwater for supplying recovered water recovered by the water recovery system to the heat recovery steam generator.

4. A gas turbine cogeneration system, comprising:
a gas turbine including a compressor, a combustor, and a turbine;
a hydrocarbon fuel supply facility for supplying hydrocarbon gas fuel to the combustor;
a hydrogen gas fuel supply facility for supplying hydrogen gas fuel which is fuel mainly composed of hydrogen gas to the combustor;
a heat recovery steam generator for generating steam using exhaust gas discharged from the turbine;
an upstream steam line for supplying the steam discharged from the heat recovery steam generator to a head end side of the combustor;
a denitration device for denitration of the exhaust gas by adding a reducing agent to the exhaust gas flowing through the heat recovery steam generator; and
a denitration control part for outputting to the denitration device a control command to set an amount of NOx emissions at a heat recovery steam generator outlet not more than a boiler outlet target value,
wherein the denitration control part is configured to generate the control command with reference to at least a first addition amount of the reducing agent obtained by calculation based on a NOx parameter which is a parameter correlated with the amount of NOx emissions at a turbine outlet, and
wherein the NOx parameter is an estimated amount of NOx emissions at the turbine outlet obtained by calculation based on a hydrogen gas fuel supply amount which is an amount of the hydrogen gas fuel supplied by the hydrogen gas fuel supply facility and an upstream steam supply amount which is an amount of the steam supplied by the upstream steam line.

5. A gas turbine cogeneration system, comprising:
a gas turbine including a compressor, a combustor, and a turbine;
a hydrocarbon fuel supply facility for supplying hydrocarbon gas fuel to the combustor;
a hydrogen gas fuel supply facility for supplying hydrogen gas fuel which is fuel mainly composed of hydrogen gas to the combustor;
a heat recovery steam generator for generating steam using exhaust gas discharged from the turbine;
an upstream steam line for supplying the steam discharged from the heat recovery steam generator to a head end side of the combustor;
a denitration device for denitration of the exhaust gas by adding a reducing agent to the exhaust gas flowing through the heat recovery steam generator; and
a denitration control part for outputting to the denitration device a control command to set an amount of NOx emissions at a heat recovery steam generator outlet not more than a boiler outlet target value,
wherein the denitration control part is configured to generate the control command with reference to at least a first addition amount of the reducing agent obtained by calculation based on a NOx parameter which is a parameter correlated with the amount of NOx emissions at a turbine outlet, and
wherein the gas turbine cogeneration system further comprises an upstream steam control part for controlling the upstream steam line so that an actual amount of NOx emissions at the turbine outlet is not more than a turbine outlet target value that is higher than the boiler outlet target value, while satisfying a condition that an upstream steam supply amount which is an amount of the steam supplied by the upstream steam line is not more than an allowable upper limit supply amount.

6. The gas turbine cogeneration system according to claim 5,
wherein the upstream steam control part is configured to, if a target upstream steam supply amount which is the upstream steam supply amount to set the amount of NOx emissions at the turbine outlet not more than the turbine outlet target value is less than the allowable upper limit supply amount, control the upstream steam line so that the upstream steam supply amount exceeds the target upstream steam supply amount and is not more than the allowable upper limit supply amount.

7. The gas turbine cogeneration system according to claim 5,
wherein the upstream steam control part has an upstream steam supply amount decision part for deciding the upstream steam supply amount to set the actual amount of NOx emissions at the turbine outlet not more than the turbine outlet target value,
wherein the gas turbine cogeneration system further comprises:
a downstream steam line for supplying the steam discharged from the heat recovery steam generator to a turbine side of the combustor that is closer to the turbine than the head end; and
a downstream steam control part for controlling the downstream steam line while satisfying a condition that a total steam supply amount which is the sum of a downstream steam supply amount which is an amount of the steam supplied by the downstream steam line and the upstream steam supply amount decided by the upstream steam supply amount decision part is not more than a supply limit to prevent the compressor from surging.

8. A method of operating a gas turbine cogeneration system,
the gas turbine cogeneration system comprising:
a gas turbine including a compressor, a combustor, and a turbine;
a hydrocarbon fuel supply facility for supplying hydrocarbon gas fuel to the combustor;
a hydrogen gas fuel supply facility for supplying hydrogen gas fuel which is fuel mainly composed of hydrogen gas to the combustor;
a heat recovery steam generator for generating steam using exhaust gas discharged from the turbine;

an upstream steam line for supplying the steam discharged from the heat recovery steam generator to a head end side of the combustor; and a denitration device for denitration of the exhaust gas by adding a reducing agent to the exhaust gas flowing through the heat recovery steam generator, the method comprising a denitration control step of outputting to the denitration device a control command to set an amount of NOx emissions at a heat recovery steam generator outlet not more than a boiler outlet target value, wherein the denitration control step includes generating the control command with reference to at least a first addition amount of the reducing agent obtained by calculation based on a NOx parameter which is a parameter correlated with the amount of NOx emissions at a turbine outlet, and wherein the NOx parameter is an estimated amount of NOx emissions at the turbine outlet obtained by calculation based on a hydrogen gas fuel supply amount which is an amount of the hydrogen gas fuel supplied by the hydrogen gas fuel supply facility and an upstream steam supply amount which is an amount of the steam supplied by the upstream steam line.

* * * * *